(12) United States Patent
Keal et al.

(10) Patent No.: US 10,706,818 B2
(45) Date of Patent: Jul. 7, 2020

(54) SYSTEM AND METHOD FOR ALIGNING SENSOR DATA TO SCREEN REFRESH RATE

(71) Applicant: INVENSENSE, INC., San Jose, CA (US)

(72) Inventors: William Kerry Keal, Santa Clara, CA (US); James B. Lim, Saratoga, CA (US)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 14/622,966

(22) Filed: Feb. 16, 2015

(65) Prior Publication Data
US 2016/0240168 A1    Aug. 18, 2016

(51) Int. Cl.
| | |
|---|---|
| *G09G 5/12* | (2006.01) |
| *G06F 1/12* | (2006.01) |
| *G06F 3/00* | (2006.01) |
| *G06F 1/16* | (2006.01) |
| *G06F 1/3215* | (2019.01) |
| *G01C 21/16* | (2006.01) |
| *G01C 19/56* | (2012.01) |
| *G01C 19/5776* | (2012.01) |

(52) U.S. Cl.
CPC .............. *G09G 5/12* (2013.01); *G01C 21/16* (2013.01); *G06F 1/12* (2013.01); *G06F 1/1694* (2013.01); *G06F 1/3215* (2013.01); *G06F 3/002* (2013.01); *G01C 19/56* (2013.01); *G01C 19/5776* (2013.01); *G06F 2200/1637* (2013.01); *G09G 2310/08* (2013.01); *G09G 2320/08* (2013.01)

(58) Field of Classification Search
CPC .. G09G 5/12; G09G 2310/08; G09G 2320/08; G06F 3/002; G06F 1/12; G06F 1/3215; G06F 1/1694; G06F 2200/1637; G01C 21/16; G01C 19/56; G01C 19/5776
See application file for complete search history.

(56) References Cited

U.S. PATENT DOCUMENTS

| | | | | |
|---|---|---|---|---|
| 9,880,185 B2 * | 1/2018 | Keal | ..................... | G01C 21/16 |
| 2010/0214216 A1 * | 8/2010 | Nasiri | ..................... | A63F 13/06 |
| | | | | 345/158 |
| 2011/0215952 A1 * | 9/2011 | Aria | ........................ | G06F 3/017 |
| | | | | 341/20 |
| 2012/0326922 A1 * | 12/2012 | Yang | ...................... | G01S 19/34 |
| | | | | 342/357.3 |
| 2013/0271487 A1 * | 10/2013 | Lincoln | ................. | G06F 3/0488 |
| | | | | 345/619 |
| 2014/0168142 A1 * | 6/2014 | Sasselli | ................. | G06F 3/0416 |
| | | | | 345/174 |
| 2014/0204036 A1 * | 7/2014 | Schillings | ........... | G06F 3/04883 |
| | | | | 345/173 |

(Continued)

*Primary Examiner* — Amare Mengistu
*Assistant Examiner* — Jennifer L Zubajlo
(74) *Attorney, Agent, or Firm* — Minisandram Law Firm; Raghunath S. Minisandram

(57) ABSTRACT

A method and system to a system to provide a sensor data to a host device is disclosed. The system includes a first clock generator that generates a first clock. The system also includes a second clock generator that generates a second clock. The sensor data is sampled based on the first clock. The sensor data is presented to the host device, based on the second clock.

30 Claims, 7 Drawing Sheets

(56) References Cited

U.S. PATENT DOCUMENTS

| | | | | |
|---|---|---|---|---|
| 2014/0260713 A1* | 9/2014 | Shaeffer | ............... | H03L 7/0891 |
| | | | | 74/5.4 |
| 2014/0278217 A1* | 9/2014 | Keal | ...................... | G01C 21/16 |
| | | | | 702/150 |
| 2014/0350891 A1* | 11/2014 | Zupke | .................... | H04L 13/16 |
| | | | | 702/189 |

\* cited by examiner

SYSTEM AND METHOD FOR ALIGNING SENSOR DATA TO SCREEN REFRESH RATE

TECHNICAL FIELD

The present invention relates generally to microelectromechanical systems (MEMS) device and more particularly, to MEMS devices with one or more sensors.

DESCRIPTION OF RELATED ART

MEMS devices are formed using various semiconductor manufacturing processes. MEMS devices may have fixed and movable portions. MEMS force sensors have one or more sense material, which react to an external influence imparting a force onto the movable portions. The sense material can be the MEMS structural layer or a deposited layer. The MEMS force sensor may be configured to measure these movements induced by the external influence to determine the type and extent of the external influence.

Output of MEMS devices is provided to a host device, for further use. In some examples, output of MEMS devices may be a signal indicative of an orientation of the host device. One or more applications running on the host device may use the signal indicative of the orientation of the host device. In some examples, the applications may display the orientation of the host device on a display device. For example, a map application may use the signal indicative of the orientation to display a map on a display that corresponds to the orientation of the host device. As one skilled in the art appreciates, orientation of the host device may change rapidly and change to the signal indicative of the orientation may be displayed on a display device, as frequently as the display device is refreshed. Sometimes, signal indicative of the orientation may be provided at a rate higher than the display screen refresh rate. Host devices require significant amount of computing resources to process updates to the orientation information. In addition, significant amount of power may be consumed by the host device to process updates to the orientation information. In some examples, processed orientation information may not be used by the application, until the next screen refresh cycle. It may be desirable to optimize the processing of orientation information by the host device.

With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method for providing a sensor data to a host device is disclosed. The method includes sampling the sensor data based on a first clock and presenting the sensor data to the host device, based on a second clock.

In yet another embodiment, a system to provide a sensor data to a host device is disclosed. The system includes a first clock generator that generates a first clock. The system also includes a second clock generator that generates a second clock. The sensor data is sampled based on the first clock. The sensor data is presented to the host device, based on the second clock.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following Figures.

DETAILED DESCRIPTION

To facilitate an understanding of the adaptive aspects of the present disclosure, an exemplary system and method for aligning sensor data to a display screen refresh rate of a host device is described. The specific construction and operation of the adaptive aspects of the system and method for aligning sensor data to a display screen refresh rate of a host device of the present disclosure are described with reference to an exemplary host device.

Figure 1:
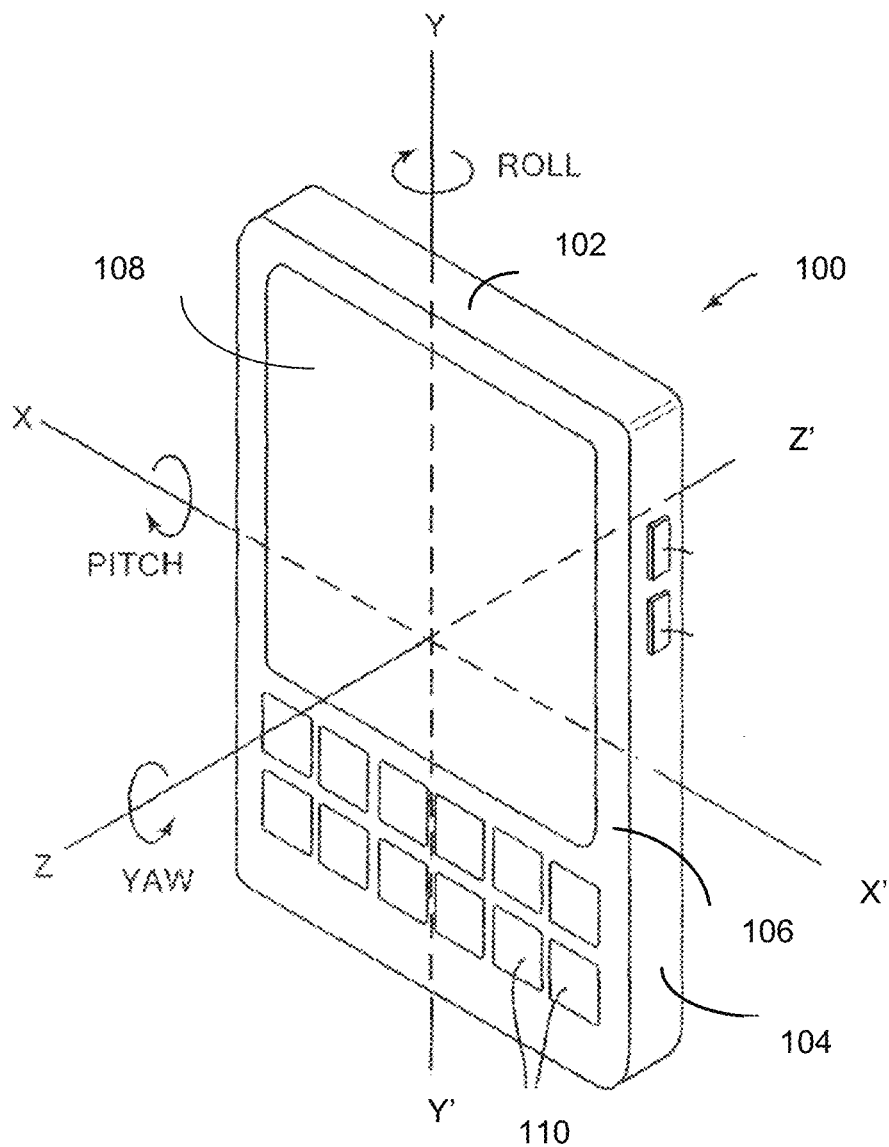
FIG. 1 shows a host device, with various axes of the device frame, according to one aspect of the present disclosure.

FIG. 1 shows a host device 100, in accordance with an embodiment of this disclosure. The orientation of the host device 100 is defined using a device frame defined by a first side 102, a second side 104 and a third side 106 of the device. As one skilled in the art appreciates, the first side 102, second side 104 and third side 106 are substantially orthogonal to each other. In one example, the host device 100 may be a mobile device, with a display screen 108 disposed over the third side 106. In some examples, the host device 100 may further include one or more input devices, for example, one or more buttons 110. As one skilled in the art appreciates, the host device 100 may be a computing device. In some examples, the host device may be a general purpose computing device. In yet another example, the host device may be a special purpose computing device. For example, the host device may be a cell phone, a watch, a gaming device, a navigation device and the likes.

In one example, an X-axis of the device frame may be defined by a line x-x' running substantially parallel to the first side 102. Similarly, a Y-axis of the device frame may be defined by a line y-y' running substantially parallel to the second side 104. A Z-axis of the device frame may be defined by a line z-z', orthogonal to both the X-axis and the Y-axis, and substantially orthogonal to the third side 106. As one skilled in the art appreciates, rotation along the X-axis may be sometimes referred to as a pitch, rotation along the Y-axis may be sometimes referred to as a roll and rotation along the Z-axis may be sometimes referred to as yaw.

Figure 2:
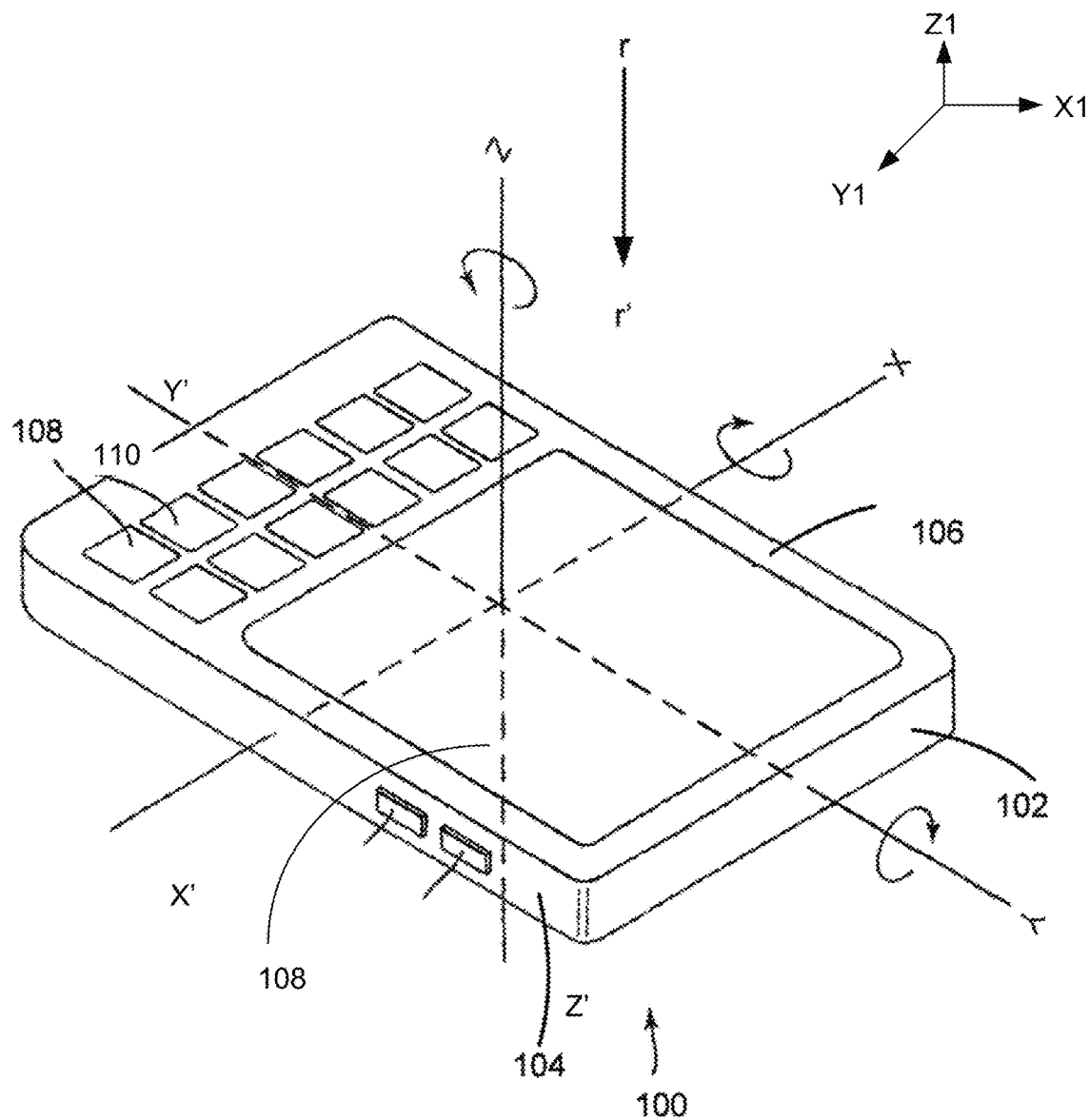
FIG. 2 shows an orientation of the host device, with reference to a stationary frame, according to one aspect of the present disclosure.

Now, referring to FIG. 2, an example orientation of the host device 100 with reference to a stationary frame will be described. In this example, a stationary reference frame with orthogonal axes X1, Y1, Z1 is defined. This reference frame is independent of the orientation of the host device 100. In some examples, one or more axes of the reference frame may correspond to a known orientation. For example, in some examples, the Z1 axis of the reference frame may correspond to earth's gravitational force axis. In another example, the X1 or Y1 axis may correspond to an orientation of the earth's magnetic field, e.g. North. In the example of FIG. 2, the Z axis of the host device 100 is aligned with the Z axis of the stationary frame. Host device 100 may be rotated, which changes the alignment between the axes of the device frame and the axes of the stationary frame. As one skilled in the art appreciates, the orientation of the host device is defined as the orientation of the axes of the device frame with respect to the axes of the stationary frame. For example, the orientation may be expressed using Euler angles, rotation matrices, or quaternions. The orientation may be thought of in terms of rotations because the orientation describes how to rotate the host device 100 so that the axes of the device frame are aligned with the axes of the stationary frame.

One or more sensors embedded in the host device 100 may provide signals to determine the orientation of the host device with reference to the stationary frame of reference. Now, referring to FIG. 3, an example system 300 with a plurality of sensors will be described. System 300 includes a plurality of sensors 302a, 302b and 302c. In one example, sensor 302a is a gyroscope, sensor 302b is an accelerometer, and sensor 302c is a magnetometer. The system further includes an orientation module 306 and an orientation projector 308.

Orientation module 306 is configured to receive output of one or more sensors, 302a, 302b and 302c, and use the output to generate a first signal 310 indicative of the orientation of the device with reference to the stationary frame. First signal 310 is then fed to the orientation projector 308. Orientation projector 308 also receives a delay signal 312, which will be further described with reference to FIG. 4A-4D. Based on the delay signal 312, the orientation projector 308 modifies the first signal 310 to a second signal 314. The second signal 314 is indicative of a projected orientation after a delay. In one example, the delay is indicated by the delay signal 312. In some examples, instead of providing a delay signal 312, the orientation projector 308 may be configured to use a predefined delay.

Various sensors for example, gyroscope 302a, accelerometer 302b and magnetometer 302c provide raw data indicative of orientation. As one skilled in the art appreciates, each sensor may have 3 axes, which are aligned with the axes of the device frame. If the sensors are not perfectly aligned with the axes of the device, small corrections may be performed so that the 3 axes of sensor output signals correspond the orthogonal axes of the device. The sensor signals for the various axes of the device frame are used by the orientation module 306 to calculate the orientation of the host device 100 with respect to the stationary frame.

The combination of the different sensor signals is often referred to as sensor fusion. For example, the accelerometer measures the acceleration on the different axes of the device frame, from which the orientation of the host device with respect to gravity can be determined. In a similar manner, the orientation of the host device with respect to the earth's magnetic field can be determined using the magnetometer signals. In addition, the gyroscope measures the angular rotation rate of the host device over the different axes of the device frame. By integrating the gyroscope signals on the different axes, the rotational angles over the different axis of the host device 100 can be calculated, from which a change in orientation can be deduced. The fusion of the information from the different sensors gives the complete orientation of the host device with respect to the stationary frame. Depending on the available sensors, sometimes the complete orientation in three dimensions may not be known, for example if only an accelerometer is available. In this case, only the orientation of the device with respect to gravity may be determined, and thus the first signal 310 and the second signal 314 represent the partial orientation with respect to gravity.

The details of the calculation of the orientation of the device in the stationary frame, i.e. the details of the sensor fusion, depend on the sensors that are available and on the quality and accuracy of the signals. The signals of the different sensors may be given a weight to determine to what extent they contribute to the fusion, or some sensor signals may even not be used at all. For example, the magnetometer signals may be given a low weight or may not be used because of magnetic perturbations. In another example, the accelerometer signals may be given a low weight or may not be used because of proper acceleration of the device that cannot be neglected compared to the acceleration due to gravity. The gyroscope signals can be used to determine the change in orientation in the absence of any other useable sensor signals, once a correct reference orientation has been determined, e.g. with the help of other sensors.

The orientation of the host device with respect to the stationary frame as calculated by the orientation module 306 may be expressed in different forms as discussed above. For example, if well-known Euler angles are used, the orientation will be described by subsequent rotations over the yaw axis, the pitch axis and the roll-axis. Alternatively, instead of performing 3 sequential rotations, quaternion techniques may be used to express the orientation as a single rotation. As an example, the use of quaternions in the orientation module 306 to determine the first signal 310 representative of the orientation of the device in the stationary frame will now be discussed. For example, a first quaternion block 316 may perform quaternion transformations as described below to perform the calculation and representation of the orientation.

A unit quaternion, also referred to as quaternion, is a 4-element vector that describes how to go from a first orientation to a second orientation using a single rotation over a unit vector. In this example, the quaternion rotation expresses the orientation of the host device as a rotation of the host device that would align the axes of the device frame with the axes of the stationary frame (as discussed above). Quaternion and unit quaternion are used interchangeable in this document. A unit quaternion has a scalar term and 3 imaginary terms. In this disclosure, the scalar term is indicated first followed by the imaginary term. In equation 1, for a quaternion, the angle θ is the amount rotated about the unit vector, $[u_x, u_y, u_z]$.

$$\overline{Q} = \begin{bmatrix} \cos\left(\frac{\theta}{2}\right) \\ \sin\left(\frac{\theta}{2}\right) \cdot u_x \\ \sin\left(\frac{\theta}{2}\right) \cdot u_y \\ \sin\left(\frac{\theta}{2}\right) \cdot u_z \end{bmatrix} \quad \text{Equation 1}$$

A quaternion multiplication is defined in Equation 2. The "$\otimes$" will represent quaternion multiplication in this document.

$$\overline{Q_2} = \begin{bmatrix} q_{2w} \\ q_{2x} \\ q_{2y} \\ q_{2z} \end{bmatrix} \quad \text{Equation 2}$$

$$\overline{Q_1} \otimes \overline{Q_2} = \begin{bmatrix} q_{1w} \times q_{2w} - q_{1x} \times q_{2x} - q_{1y} \times q_{2y} - q_{1z} \times q_{2z} \\ q_{1w} \times q_{2x} + q_{1x} \times q_{2w} + q_{1y} \times q_{2z} - q_{1z} \times q_{2y} \\ q_{1w} \times q_{2y} - q_{1x} \times q_{2z} + q_{1y} \times q_{2w} + q_{1z} \times q_{2x} \\ q_{1w} \times q_{2z} + q_{1x} \times q_{2y} - q_{1y} \times q_{2x} + q_{1z} \times q_{2w} \end{bmatrix}$$

A quaternion inverse is defined in Equation 3.

$$\overline{Q_1'} = \begin{bmatrix} q_{1w} \\ -q_{1x} \\ -q_{1y} \\ -q_{1z} \end{bmatrix} \quad \text{Equation 3}$$

Given angular velocity in radians/second in Equation 4, with magnitude $\omega_m$ shown in Equation 5, with a gyroscope data $[w_0, w_1, w_2]$ sampled with timesteps of t, a quaternion can be defined as described below with reference to Equation 6:

$$\omega = [\omega_x, \omega_y, \omega_z] \quad \text{Equation 4}$$

$$\omega_m = \sqrt{\omega_x{}^\wedge\omega_x + \omega_y{}^\wedge\omega_y + \omega_z{}^\wedge\omega_z} \quad \text{Equation 5}$$

$$\overline{Q_w} = \begin{bmatrix} \cos\left(w_m \cdot \frac{t}{2}\right) \\ \frac{w_0}{w_m}{}^\wedge\sin\left(w_m{}^\wedge\frac{t}{2}\right) \\ \frac{w_1}{w_m}{}^\wedge\sin\left(w_m{}^\wedge\frac{t}{2}\right) \\ \frac{w_2}{w_m}{}^\wedge\sin\left(w_m{}^\wedge\frac{t}{2}\right) \end{bmatrix} \quad \text{Equation 6}$$

Then the quaternion update equation that describes how to go from a first orientation $Q_N$ to a second orientation $Q_{N+1}$ would be, as shown below in Equation 7:

$$\overline{Q_{N+1}} = \overline{Q_N} \otimes \overline{Q_w} \quad \text{Equation 7}$$

For small updates, i.e. small rotation angles, Equation 7 can be rewritten using Taylor approximations for the sine and cosine as shown below in Equation 8:

$$\overline{Q_{N+1}} = \overline{Q_N} + \frac{t}{2}{}^\wedge\overline{Q_N} \otimes \begin{bmatrix} 0 \\ w_0 \\ w_1 \\ w_2 \end{bmatrix} \quad \text{Equation 8}$$

$$\overline{Q_{N+1}} = \frac{\overline{Q_N}}{\|\overline{Q_N}\|}$$

In Equation 8, previous quaternion is multiplied by the rotation rate from the gyroscope (in radians) using a quaternion multiply. This is scaled by the time between samples over 2 and added to the previous quaternion. Next, the quaternion is divided by the magnitude to maintain a magnitude of 1.

As previously described, the output of the orientation module 306, i.e. first signal 310, is fed to the orientation projector 308. Orientation projector 308 also receives a delay signal 312. Based on the delay signal 312, the orientation projector 308 modifies the first signal 310 to a second signal 314. The second signal 314 is indicative of a projected orientation after a delay. In one example, the calculation and representation of the projected orientation after a delay may also be based on a quaternion rotation as described with reference to the orientation module 306 and first quaternion block 316. For example, a second quaternion block 318 in orientation projector 308 may perform quaternion transformations. The second quaternion block 318 may be similar in construction and operation, as previously described with reference to first quaternion block 316.

For example, if the delay 312 is equal to "t", as previously discussed with reference to equations 4, 5, 6, 7 and 8, the quaternion update equation can be used to calculate the projected orientation as provided in equation 7 or in the alternative, as provided in equation 8. In this case, quaternion $Q_N$ represents the orientation before the projection (first signal 310), and quaternion $Q_{N+1}$ represents the projected orientation (second signal 314) after delay t 312. Both equation 7 and equation 8 are reproduced below for ready reference.

$$\overline{Q_{N+1}} = \overline{Q_N} \otimes \overline{Q_w} \quad \text{Equation 7}$$

$$\overline{Q_{N+1}} = \overline{Q_N} + \frac{t}{2}{}^\wedge\overline{Q_N} \otimes \begin{bmatrix} 0 \\ w_0 \\ w_1 \\ w_2 \end{bmatrix} \quad \text{Equation 8}$$

$$\overline{Q_{N+1}} = \frac{\overline{Q_N}}{\|\overline{Q_N}\|}$$

Now, referring to FIGS. 4A, 4B, 4C and 4D an example relationship between a device clock and a clock of a motion processing unit (further referred to as MPU) according to an embodiment of this disclosure is described. For example, MPU 508 will be further explained in detail with reference to FIG. 5.

Figure 4:
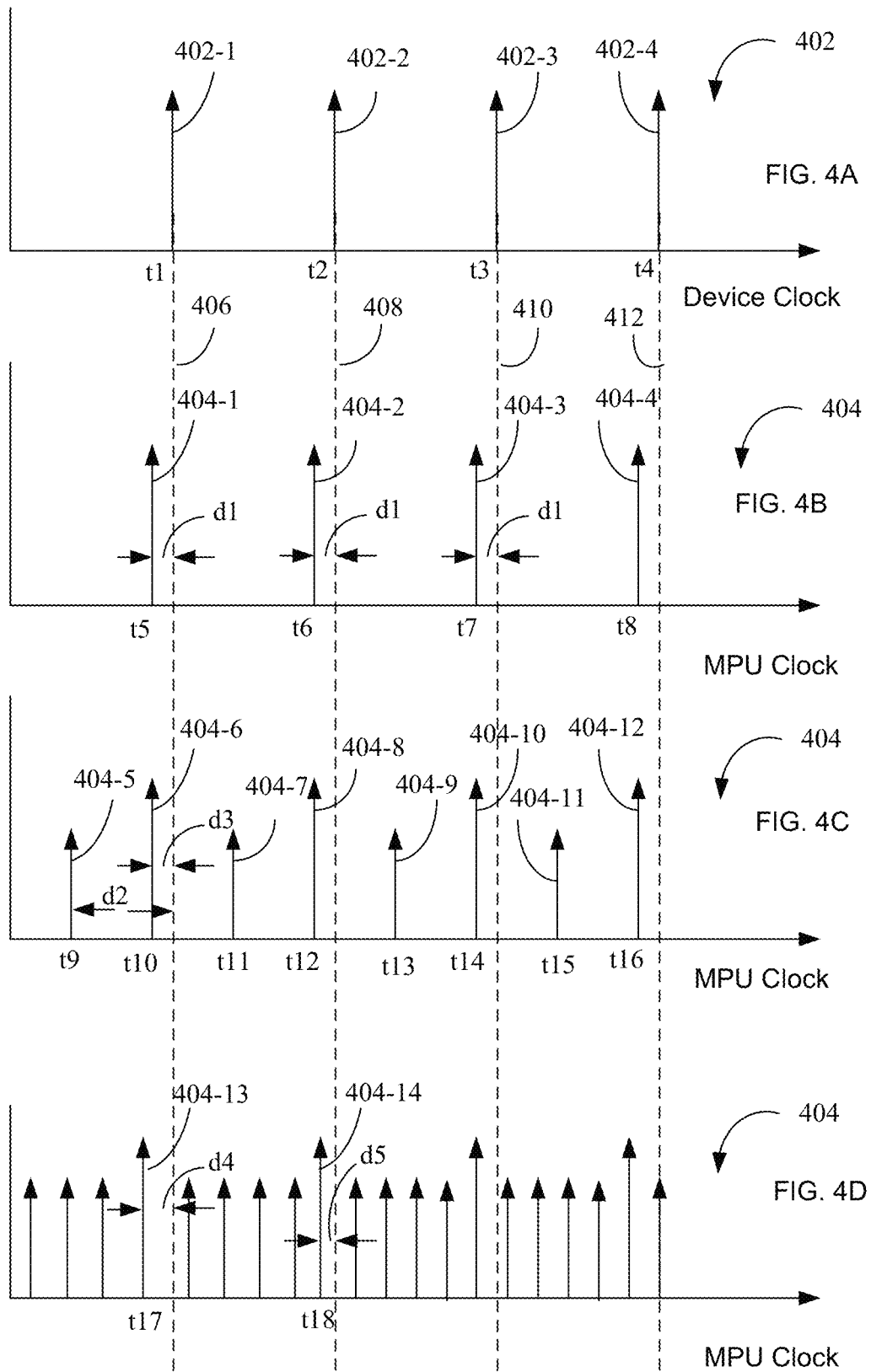
FIG. 4A shows an example device clock, according to one aspect of the present disclosure.
FIGS. 4B-4D show different example MPU clocks, according to one aspect of the present disclosure.
Figure 5:
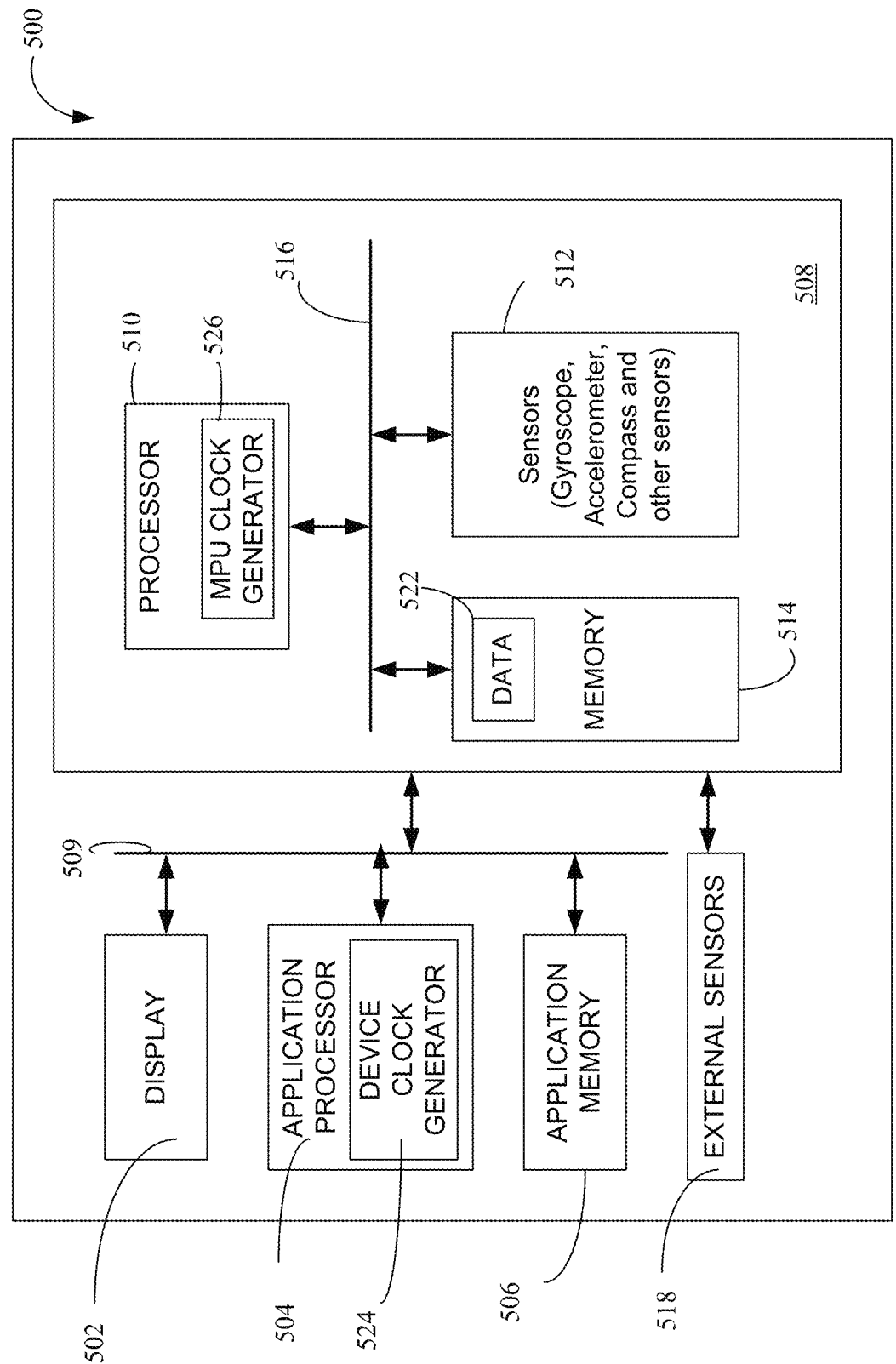
FIG. 5 shows an example host device, according to one aspect of the present disclosure.

Now referring to FIG. 4A, an example device clock 402 is shown. Device clocks 402-1, 402-3, 402-3 and 402-4 occur periodically, at times t1, t2, t3 and t4, as shown along x-axis, x-axis representative of time. As previously described, the device clock may correspond to a refresh rate of the display screen of the host device.

FIGS. 4B, 4C and 4D shows three alternate examples of MPU clock 404 that occurs periodically and their relationship to the occurrence of corresponding device clock 402, as shown in FIG. 4A. Dotted lines 406, 408, 410 and 412 are used to explain the relationship between the device clock 402 and MPU clock 404. In some examples, MPU clock may correspond to sampling of sensor data by the MPU 508. For example, sensor data may be made available by a sensor for sampling by the MPU 508. In some examples, orientation of the host device at the time of sampling of the sensor data may correspond to the first signal 310.

Now, referring to FIG. 4B, one example MPU clock 404 is shown. MPU clocks 404-1, 404-2, 404-3 and 404-4 occur periodically, at times t5, t6, t7 and t8, as shown along x-axis, x-axis representative of time. In this example, MPU clocks 404-1, 404-2, 404-3 and 404-4 occur ahead of corresponding device clocks 402-1, 402-3, 402-3 and 402-4, by a delay of d1. In this example, the frequency of the device clock is substantially the same as the frequency of the MPU clock. As previously described, in this example, the orientation projector 308 of FIG. 3 will use a delay 312 of d1 to project the likely orientation of the host device, at the occurrence of the corresponding device clock. For example, orientation of the host device indicated at the occurrence of MPU clock 404-1 will be projected using orientation projector 308 to indicate the likely orientation of the host device at the occurrence of device clock 402-1.

In some examples, it may be preferable to have a MPU clock that is at a higher frequency than the device clock. Now, referring to FIG. 4C, another example MPU clock 404 is shown. MPU clocks 404-5, 404-6, 404-7, 404-8, 404-9, 404-10, 404-11 and 404-12 occur periodically, at times t9, t10, t11, t12, t13, t14, t15 and t16, as shown along x axis, x axis representative of time. In this example, the frequency of the device clock is substantially about twice the frequency of the MPU clock.

In this example, MPU clocks 404-5, 404-7, 404-9 and 404-11 occur ahead of corresponding device clocks 402-1, 402-3, 402-3 and 402-4, by a delay of d2. MPU clocks 404-6, 404-8, 404-10 and 404-12 occur ahead of corresponding device clocks 402-1, 402-3, 402-3 and 402-4, by a delay of d3. If several MPU clocks occur between device clocks, each with its own delay, the least delay between the occurrence of the MPU clock and corresponding device clock is chosen. In this example, delay d3 is chosen over delay d2. Further, in some examples, the delay d3 may have to be sufficient to permit processing of the orientation information by the host device, to display a change in the orientation of the host device on a display screen. Meaning, for example, that if d3 is too short to determine the projected orientation at device clock 402-1 based on the orientation at MPU clock 404-6, the orientation at device clock 402-1 may be chosen equal to the orientation at MPU clock 404-6, or may be projected using the longer delay d2 in combination with the orientation at MPU clock 404-5.

Figure 3:
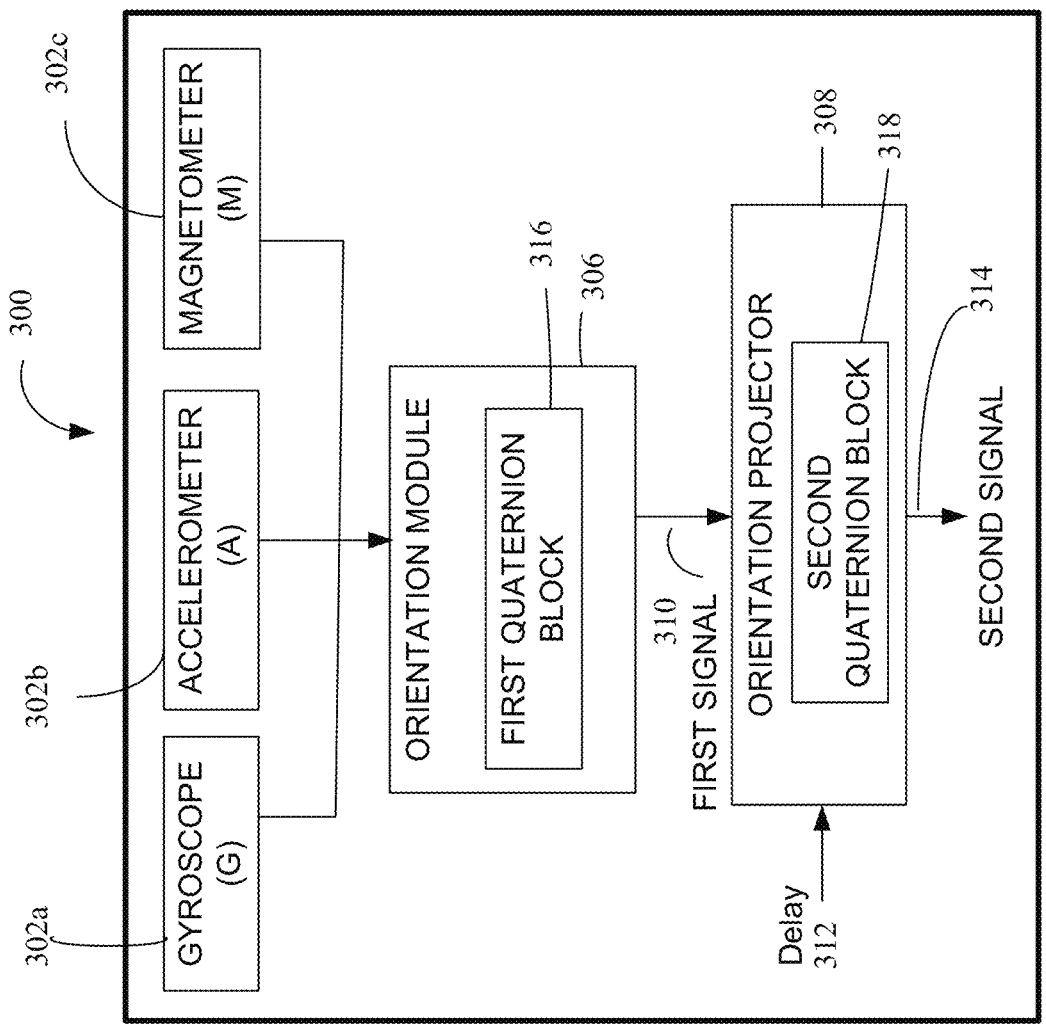
FIG. 3 shows a block diagram of a system with a plurality of sensors, according to one aspect of the present disclosure.

As previously described, in this example, the orientation projector of FIG. 3 will use a delay of d3 to project the likely orientation of the host device, at the occurrence of the corresponding device clock. For example, orientation of the host device indicated at the occurrence of MPU clock 404-6 (i.e. first signal 310) will be projected to indicate the likely orientation of the host device at the occurrence of device clock 402-1 (i.e. second signal 314). If the frequency of the MPU clock is substantially equal to the frequency of the device clock (FIG. 4B) or substantially equal to a multiple of the frequency of the device clock (FIG. 4C), the delays (d1, d2, d3) are substantially constant. In this case, the delays may be set or be determined only once, and applied to all sampling cycles.

In some examples, it may be preferable to have a MPU clock that is at a higher frequency than the device clock. However, the frequency of the MPU clock may not be a multiple of the frequency of the device clock. Now, referring to FIG. 4D, another example MPU clock 404 is shown. In some examples, number of MPU clocks that occur between two consecutive device clock may vary. In some examples, the timing of the occurrence of MPU clock may not be in synchronization with the timing of the occurrence of the device clock. For example, delay between MPU clock 404-13 occurring at time t17 and corresponding device clock 402-1 is a delay of d4, whereas, the delay between MPU clock 404-14 occurring at time t18 and corresponding device clock 402-2 is a delay of d5. Delay d4 and delay d5 may not be same. Further, in some examples, the delay d4 and d5 may have to be sufficient to permit processing of the orientation information by the host device, to display a change in the orientation of the host device on a display screen.

As previously described, in this example, the orientation projector of FIG. 3 will selectively use a delay to project the likely orientation of the host device, at the occurrence of the corresponding device clock. For example, using a delay of d4, orientation of the host device indicated at the occurrence of MPU clock 404-13 will be projected to indicate the likely orientation of the host device at the occurrence of device clock 402-1. Similarly, using a delay of d5, orientation of the host device indicated at the occurrence of MPU clock 404-14 will be projected to indicate the likely orientation of the host device at the occurrence of device clock 402-2. In some examples, information related to delay d4 and d5 will be fed to the orientation projector 308 as delay 312.

For computational efficiency, it may be preferred to only process the orientation signal corresponding to the occurrence of the MPU clock of interest. In other words, it is only necessary to process those orientation signals that are used to determine the final projected orientation of interest. For example, only orientation signals at MPU clocks 404-13 and 404-14 need to be converted into projected orientations at device clocks 402-1 and 402-2, respectively. The sensor data for the other occurrences of the MPU clock might not need to be processes, for example by the orientation module 306.

In the examples of FIGS. 4C and 4D, in general only the orientation signal at the last occurrence of the MPU clock before the device clock is used in the orientation projection using the quaternion update equations described above. Alternatively, if the MPU clock has a higher frequency than the device clock, more than one sensor data sample may be available in between subsequent device clocks. If this is the case, a plurality of sensor signals may be used or combined to calculate the projected orientation at the device clock. In FIG. 4C, the orientation signals at MPU clock 404-5 and 404-6 may both be used to determine the projected orientation at device clock 402-1, for example using linear, or higher order, extrapolation methods. Similarly, in FIG. 4D, all 5 orientation signals between device clock 402-1 and 402-2 may be used in the extrapolation methods.

In the examples discussed above in relation to FIG. 4B-4D, the required orientation at the time of the device clock was based on a projection of an orientation calculated by the orientation module 306. In an alternative embodiment, the projection calculations and the orientation calculation might be inversed, meaning that order of the orientation module 304 and the projector 308 are inversed. This implies that the first step is to project the (raw) sensor data, which is acquired using a first clock, to the device clock using e.g. the projection techniques discussed above. Once the likely sensors data at the device clock has been determined using the projection, the projected sensor data is used to determine the projected orientation in the stationary frame using orientation module 306. Now, referring to FIG. 5, an example host device 500 is described. Host device 500 may be similar to host device 100 as described with reference to FIG. 1. The host device 500 includes a display 502, an application processor 504, application memory 506 and a motion processing unit 508 (sometimes referred to as MPU), all communicating over a host bus 509. In some examples, application processor 504 may include a device clock generator 524. In some examples, device clock generator 524 may be independent of the application processor 504 and coupled to the host bus 509 so as to provide device clock signals to various components of the host device 500.

MPU 508 includes a processor 510, one or more sensors 512, a memory 514, all communicating with each other over a MPU bus 516. One or more external sensors 518 may communicate with the MPU 508 over link 520. Data 522 portion of memory 514 may be used to store permanent and transient values generated during the operation of the MPU 508. For example, information related to sensors, orientation information, signals generated during the operation, time stamps of various operations performed and the like may be stored in the data 522 portion of memory 514. In some examples, the MPU 508 may be separate from the host device 500, but coupled over a link to communicate with the host device 500.

In some examples, MPU 508 may include a MPU clock generator 526. In some examples, MPU clock generator 526 may be part of the processor 510. In some examples, MPU clock generator 526 may be independent of the processor 510 and coupled to the MPU bus 516 so as to provide MPU clock signals to various components of the MPU 508. The MPU clock signals may be used to time stamp the sensor or orientation signals in order to determine the delay 312, using either MPU processor 510 or application processor 504. The device clock and the MPU clock may also both be used as an input to the orientation projector 308, which will then determine the delay 312 using the time stamp info from both clocks. In some examples, MPU 508 may implement one or more functional modules described with reference to system 300. For example, sensors 302a, 302b and 302c of system 300 may correspond to sensors 512. In some examples, one or more sensors 302a, 302b and 302c may correspond to external sensors 518. In some examples, orientation module 306 and orientation projector 308 may be implemented in the MPU 508. As one skilled in the art appreciates, these functional modules may be implemented as a hardware, software or a combination of hardware and software modules.

In some examples, one or more of these functional modules may be implemented as software functions stored in the memory 514, which are executed by the processor 510. In some examples, some of these functional modules may be implemented as software functions stored in the application memory 506, which are executed by the application processor 504. Results of these functions may be reported back to the MPU 508.

In one example, the MPU 508 is configured to communicate information related to orientation of the host device 500 to the application processor 504, over bus 509. The information related to orientation of the host device may be stored in the application memory 506. The stored information related to orientation may be used by one or more applications running on the host device to manipulate or change information displayed on the display 502. In some examples, the information related to orientation may indicate a gesture, based upon a change in the information related to orientation over time. In some examples, the display 502 is refreshed or updated based on the device clock signals generated by the device clock generator 524.

In some examples, the MPU 508 may raise an interrupt or other signal to the application processor 504, for example, over bus 509 to indicate availability of orientation information related to the host device. The orientation information might include time stamp data of the MPU clock that can be used to determine the delay 312 in relation to the device clock. For example, the next occurrence of the device clock might be known or calculated based on previous device clocks, and by subtracting the MPU time stamp of the orientation information, the delay can be determined. In this case the projected orientation is determined when the first signal, i.e. the input for the projection, becomes available. Alternatively, the projected orientation is calculated at the occurrence of the device clock, and the delay is determined from the amount of time that has elapsed since occurrence of the last MPU clock when the sensor data was produced that was used to determine the orientation that served as the input for the projection (i.e. the first signal). If the MPU clock frequency is substantially equal to (a multiple) of the frequency of the device clock, the delay 312 is constant and may only need to be calculated once. In some examples, the orientation information and/or the delay information may be stored in a data storage location of the memory 514, for example, a data storage location of a data 522 portion of the memory. In some examples, the application processor 504 may be in a sleep or hibernation mode to minimize the power consumption of the host device and the interrupt signal awakes the application processor 504 to an active state.

Such an interrupt or signal may be processed by the application processor 504 to access the data storage location of the memory 514 and retrieve the orientation information which may include the corresponding time stamp data. In some examples, the retrieved orientation information may correspond to the second signal 314, as previously described. The application processor 504 may use the orientation information to update corresponding orientation based information on the display 502, during the next display screen refresh cycle. In some examples, the display screen refresh cycles may correspond to the device clock cycles described with reference to FIG. 4A.

Figure 6:
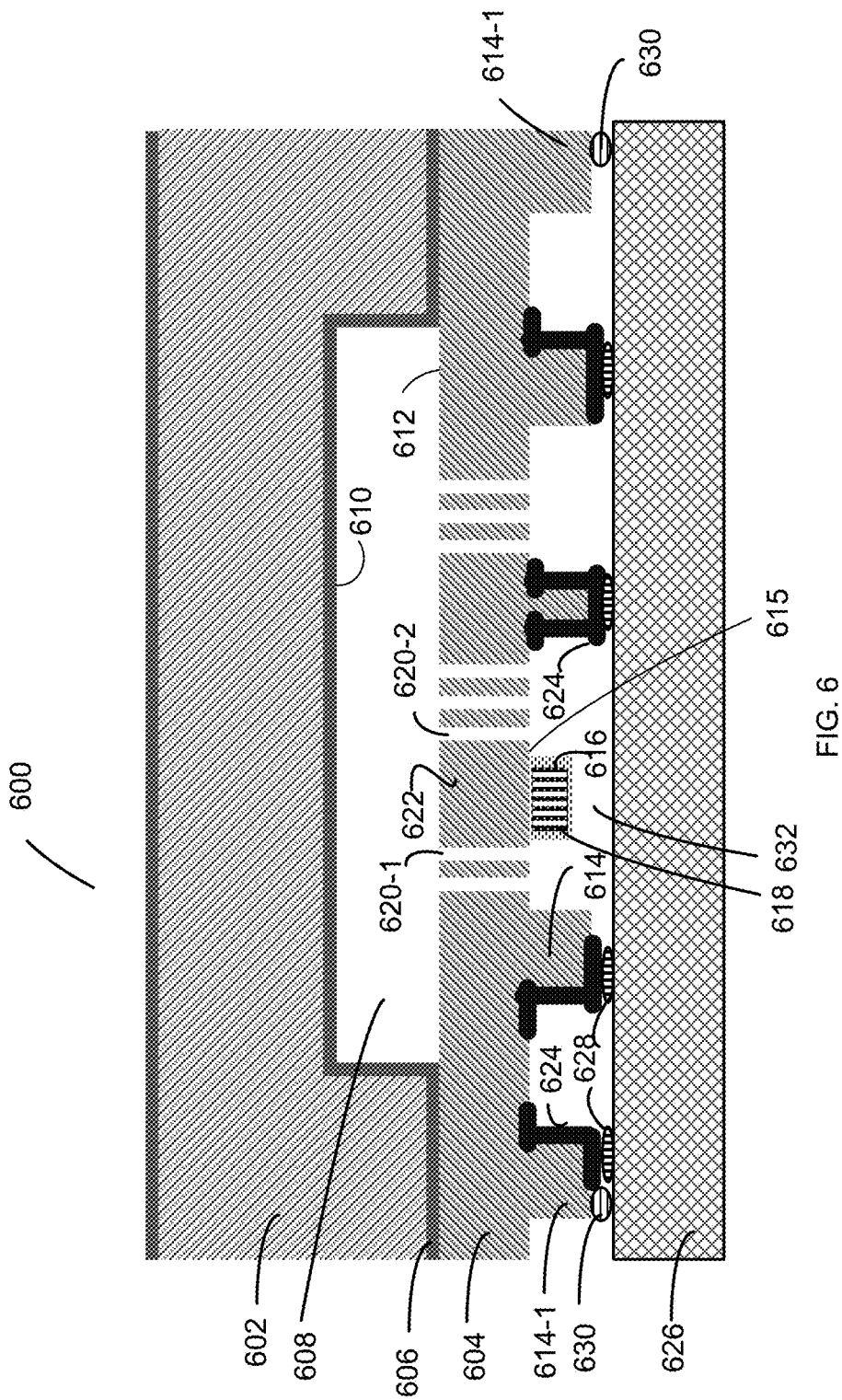
FIG. 6 shows an example MEMS device, according to one aspect of the present disclosure.

Now, referring to FIG. 6, an example MEMS device 600 is described. In some examples, MEMS device 600 may correspond to the MPU 508 described with reference to FIG. 5. Substrate 600 includes a handle layer 602 and a device layer 604. One or more sensors are formed on the device layer 604. An example magnetic sensor will be described with reference to the MEMS device 600. Magnetic sensor may be configured as a compass. As one skilled in the art appreciates, in a similar manner other or additional sensors may be formed on the device layer, for example, an accelerometer and/or a gyroscope.

A fusion bond layer 606 bonds the handle layer 602 to device layer 604, to form an upper cavity 608, defined by the lower side 610 of the handle layer 602 and upper side 612 of the device layer 604. Now referring to device layer 604, a plurality of standoff 614 structures are formed on the device layer 604, for example, by deep reactive ion etching (DRIE) process. Magnetic films are deposited, patterned and magnetized on the lower side 615 of the device layer 604, to form a first permanent magnet 616. The first permanent magnet 616 is oriented in a predefined direction by applying an external magnetic field.

In some embodiments, a protective layer 618 is deposited over the first permanent magnet 616, to prevent oxidization of the first permanent magnet 616.

FIG. 6 also shows trench patterns 620-1 and 620-2, an actuator 622, device pads 624, integrated circuit substrate 626, IC pads 628 and seal ring 630. A movable actuator 622 is created by forming a plurality of trench patterns 620-1 and 620-2 on the device layer 604, for example, using a DRIE process. First permanent magnet 616 is located on the first actuator 622. Next, device pads 624, preferably made of germanium alloys are deposited and patterned on the device layer 604.

Integrated circuit substrate 626 includes one or more electronic circuits that communicate with various sensors formed on the device layer 604. IC pads 628, preferably made of aluminum alloys are deposited and patterned on the integrated circuit substrate 626. IC pads 628 are coupled to device pads 624 to provide a communication path to various sensors formed on the device layer 604. For example, device pads 624 may be eutectic bonded with IC pads 628. As previously described with reference to FIG. 5 one or more components of MPU 508 for example, processor 510, memory 514 and MPU bus 516 may also be provided or fabricated on the integrated circuit substrate 526.

Standoff 614-1 surrounds various devices formed on the device layer 604. A seal ring 630 is formed on the standoff 614-1 to bond the device layer 604 with integrated circuit substrate 626, for example, to hermetically seal various devices formed on the device layer 604. Height of the standoff 614-1, along with seal ring 630 define height of the lower cavity 632.

Figure 7:
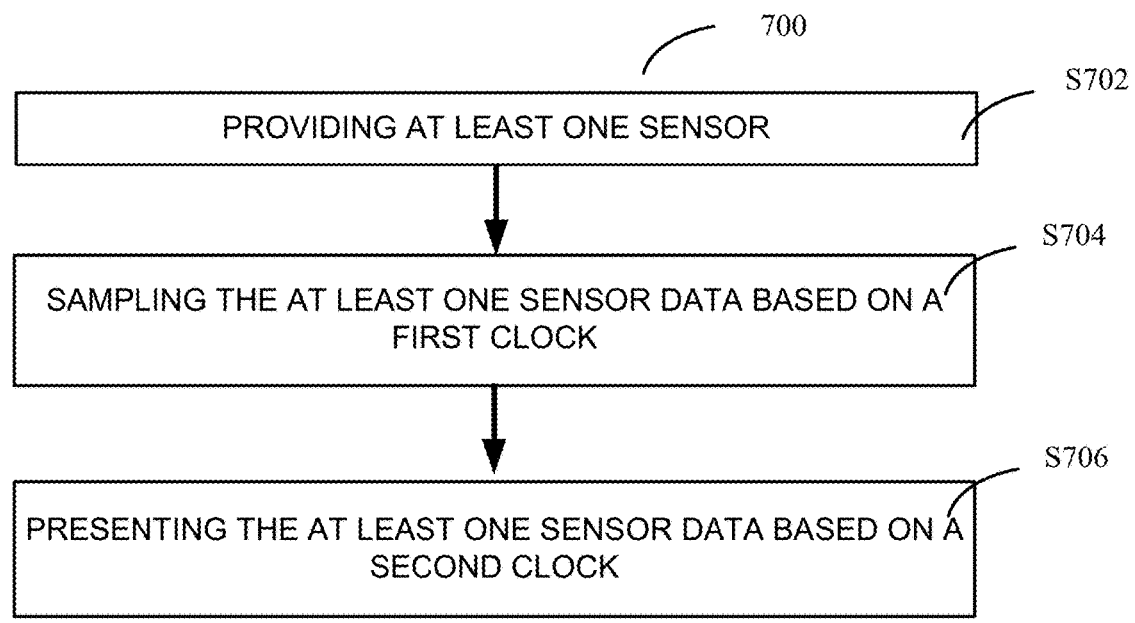
FIG. 7 shows a flow diagram to provide a sensor data to a host device, according to one aspect of the present disclosure.

Now, referring to FIG. 7, an example flow diagram 700 will be described. In block S702, at least one sensor is provided. For example, one or more of sensors 302*a*, 302*b* and 302*c* are provided.

In block S704, sensor data is sampled based on a first clock. For example, a sensor data may be sampled based on the MPU clock. In some examples, the sampled sensor data may be indicative of an orientation of the host device in a stationary frame.

In block S706, the sensor data is presented based on a second clock. For example, sampled sensor data may be presented to a host device, based on the device clock. In some examples, the presented sensor data may be a signal indicative of the orientation of the host device. In some examples, the presented sensor data may be a quaternion. In some examples, the presented data may be a projected orientation information based on a delay between the first clock and the second clock.

In the embodiments above, the orientation of the device was used as an example to describe the invention. However, the invention applies to any type of sensors that are sampled on a first clock, and where the system will need accurate results on the basis of a second clock. For example, for any kind of data or information that needs to be displayed accurately and in real time, the projection techniques discussed in relation to projector 308 might be applied to project the data or information from the occurrences of the first clock to the actual time of display, controlled by the second clock.

In some examples, for any information that is presented to the user on the device screen, but that is based on processing that may be provided at a rate higher than the display screen refresh rate, it may be desirable to optimize the processing in between two screen updates. This may be achieved, for example, as described in this disclosure.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for providing a sensor data to a host device, comprising:
   providing a motion processing unit with a first clock generator and a sensor, the first clock generator generating a first clock;
   providing a second clock generator in the host device, the second clock generator generating a second clock;
   sampling the sensor data based on the first clock, the sensor data sampled in the motion processing unit based on the first clock ahead of the second clock, sensor data presented to the host device based on the second clock;
   modifying the sampled sensor data based on the first clock to generate a projected sensor data by the motion processing unit, the projected sensor data indicative of a likely future sensor data at the time of presenting the sensor data to the host device, based on the second clock, projected sensor data generated based on a time difference between the first clock and the second clock, wherein the time difference indicates how much time the second clock is ahead in future from the first clock used to sample the sensor data; and
   presenting the generated projected sensor data indicative of the likely sensor data at the time of presenting the sensor data to the host device based on the second clock.

2. The method of claim 1, wherein the frequency of the first clock is substantially a multiple of the frequency of the second clock.

3. The method of claim 1, wherein the second clock corresponds to a display screen refresh rate of the host device.

4. The method of claim 1, wherein the first clock is substantially a multiple of the second clock and selecting a clock cycle of the first clock by a time differences that is least ahead of a corresponding clock cycle of the second clock to sample the sensor data.

5. The method of claim 1, wherein a plurality of first clocks occur between two consecutive second clocks, selectively selecting one of the plurality of first clocks wherein the time difference between the selected first clock and the second clock that occurs after the selected first clock is at least sufficient to permit sampling, modifying of the sensor data and presenting projected sensor data indicative of the likely sensor data at the time of presenting the sensor data based on the second clock to the host device, with at least one more first clock occurring between the selected first clock and the second clock that occurs after the selected first clock.

6. The method of claim 1, wherein the first clock is at least twice the frequency of the second clock.

7. The method of claim 1, wherein the sensor is at least one of an accelerometer, gyroscope and a magnetometer.

8. The method of claim 1, wherein the motion processing unit generates an interrupt to the host device, to present the projected sensor data to the host device.

9. The method of claim 8, wherein the host device includes an application processor and the interrupt awakes the application processor, upon issuance of the interrupt.

10. The method of claim 9, wherein the application processor is in a sleep mode, prior to receipt of the interrupt from the motion processing unit.

11. The method of claim 1, wherein the sensor data based on the first clock is converted to a first signal indicative of the orientation of the device with reference to a stationary frame, wherein the first signal is a quaternion.

12. The method of claim 11, wherein the first signal indicative of the orientation of the device is modified by an orientation projector to generate a second signal, wherein the second signal is a projected signal indicative of the likely orientation of the device at the time of the occurrence of the second clock, based on a time difference between the first clock and the second clock.

13. The method of claim 12, further including, generating an interrupt by the motion processing unit to the host device, to present the generated second signal, the second signal indicative of the likely orientation of the device at the time of occurrence of the second clock.

14. The method of claim 13, further including retrieving the second signal by the host device, and refreshing a display screen of the host device, based on the second clock, wherein the display screen is refreshed based on the projected likely orientation of the device at the time of the occurrence of the second clock, indicated by the retrieved second signal.

15. The method of claim 1, wherein at the time of presenting the sensor data based on the second clock is a time in the future where no sensor data from the sensor is yet available.

16. A system to provide a sensor data to a host device, comprising:
a motion processing unit with a first clock generator and a sensor, the first clock generator configured to generate a first clock;
a second clock generator in the host device, the second clock generator configured to generate a second clock;
the sensor data sampled from the sensor, based on the first clock;
the sampled sensor data based on the first clock modified by the motion processing unit to generate a projected sensor data, the projected sensor data indicative of a likely future sensor data at the time of presentation of the sensor data to the host device, based on the second clock, projected sensor data generated based on a time difference between the first clock and the second clock, wherein the time difference indicates how much time the second clock is ahead in future from the first clock used to sample the sensor data; and
the generated projected sensor data indicative of the likely sensor data at the time of presentation of the sensor data is presented by the motion processing unit to the host device based on the second clock.

17. The system of claim 16, wherein the frequency of the first clock is substantially a multiple of the frequency of the second clock.

18. The system of claim 16, wherein the second clock corresponds to a display screen refresh rate of the host device.

19. The system of claim 16, wherein the first clock is substantially a multiple of the second clock and a clock cycle of the first clock is selected by a time difference that is least ahead of a corresponding clock cycle of the second clock to sample the sensor data.

20. The system of claim 16, wherein a plurality of first clocks occur between two consecutive second clocks, one of the plurality of first clocks is selectively selected wherein the time difference between the selected first clock and the second clock that occurs after the selected first clock is at least sufficient to sample and modify the sensor data and present projected sensor data indicative of the likely sensor data at the time of presenting the sensor data based on the second clock to the host device, with at least one more first clock occurring between the selected first clock and the second clock that occurs after the selected first clock.

21. The system of claim 16, wherein the first clock is at least about twice the frequency of the second clock.

22. The system of claim 16, wherein the sensor is at least one of accelerometer, gyroscope and a magnetometer.

23. The system of claim 16, wherein the motion processing unit generates an interrupt to the host device, to present the projected sensor data at the time of presenting the sensor data based on the second clock to the host device.

24. The system of claim 23, wherein the host device includes an application processor and the interrupt awakes the application processor, upon issuance of the interrupt.

25. The system of claim 24, wherein the application processor is in a sleep mode, prior to receipt of the interrupt from the motion processing unit.

26. The system of claim 16, wherein the sensor data based on the first clock is converted to a first signal indicative of the orientation of the device with reference to a stationary frame, wherein the first signal is a quaternion.

27. The system of claim 26, wherein the first signal indicative of the orientation is modified by an orientation projector to generate a second signal, wherein the second signal is a projected signal indicative of the likely orientation of the device at the time of the occurrence of the second clock, based on a time difference between the first clock and the second clock.

28. The system of claim 27, wherein the motion processing unit generates an interrupt to the host device, to present the generated second signal, the second signal indicative of the likely orientation of the device at the time of occurrence of the second clock.

29. The system of claim 28, wherein the second signal is retrieved by the host device and a display screen of the host device is refreshed based on the second clock and the display device is refreshed based on the projected likely orientation of the device at the time of presenting the sensor data based on the second clock indicated by the retrieved second signal.

30. The system of claim 16, wherein at the time of presenting the sensor data based on the second clock is a time in the future where no sensor data from the sensor is yet available.

* * * * *